June 26, 1956 P. R. R. AIGRAIN 2,752,530

IMPULSE COINCIDENCE CIRCUIT

Filed Feb. 19, 1953

Inventor
P.R.R. AIGRAIN

By Robert Harding Jr.
Attorney

United States Patent Office 2,752,530

Patented June 26, 1956

2,752,530

IMPULSE COINCIDENCE CIRCUIT

Pierre Roger Raoul Aigrain, Paris, France, assignor to International Standard Electric Corporation, New York, N. Y., a corporation of Delaware Application February 19, 1953, Serial No. 337,840

Claims priority, application France February 21, 1952

4 Claims. (Cl. 315—168)

The present invention relates to circuits known as impulse coincidence circuits such as those used in electronic devices for detecting the coincidence of two impulses.

In the circuits used in electronic technique many devices are known for detecting the coincidence of two impulses, this coincidence being materialised by the presence or the absence of an output signal. The devices known in the art under the name of electronic gates constitute a particular type of coincidence circuit in which the coincidence of the signal to be transmitted and of the control impulse causes the setting up at the output terminal of a signal analogous to the signal applied to the input. On the other hand, various types of impulse coincidence circuits may be realized according to the sign of the control impulses used, the sign of the output impulse, the continuous level of the input impulses, the position in time of the output impulse and the duration of the output impulse.

One of the objects of the present invention is to provide an impulse coincidence circuit comprising only a small number of static elements such as resistances, condensers or rectifiers.

Another object of the present invention is to provide an impulse coincidence circuit operating under the influence of two controlling impulses of opposite sign.

Another object of the invention is to provide an impulse coincidence circuit in which the duration of the output impulse may vary according to the constants of the circuit.

According to one of the features of the invention, an impulse coincidence circuit comprises in combination: a condenser, means for charging the said condenser by negative impulses, means for charging the said condenser by positive impulses, the said means being provided in order that the charges are added when the condenser is simultaneously charged by a positive impulse and a negative impulse, a threshold circuit adapted for measuring the potential difference at the terminals of the condenser and for giving an output impulse when the potential at the terminals of the condenser reaches a value corresponding to a simultaneous charge by two impulses respectively negative and positive.

According to another feature of the invention, the charging circuit of the condenser comprises in combination: a condenser and a rectifier connected in series between two terminals, means for applying to one of the terminals positive impulses, the said terminal being chosen in order that the charging current of the condenser traverses the rectifier in the direction corresponding to its lowest resistance, means for applying to the other terminal negative impulses.

According to another feature of the invention a threshold circuit comprises in combination: a rectifier connected between an output terminal and a point common to the said condenser and to the said rectifier connected in the charging circuit, the electrode of the rectifier connected to the output terminal being suitably biassed and the rectifier being connected in a direction such that it offers a high resistance when the condenser is charged by a single positive or negative impulse and that it offers a low impedance when the condenser is charged at the same time by a positive and a negative impulse.

According to another feature of the invention, the threshold circuit comprises in combination: a gas tube comprising at least a cathode, an anode and a triggering electrode, the said triggering electrode being connected to the point common to the condenser and to the rectifier in the charging circuit, the cathode of said gas tube being brought back to a suitable potential so that the potential of the triggering electrode with respect to the cathode does no reach the valve necessary for causing the lighting of the tube except when the condenser is charged simultaneously by a positive impulse and a negative impulse.

Other objects, features and advantages of the present invention will appear from a reading of the following description of embodiments the said description being given in conjunction with the accompanying drawings in which.

Figure 1:
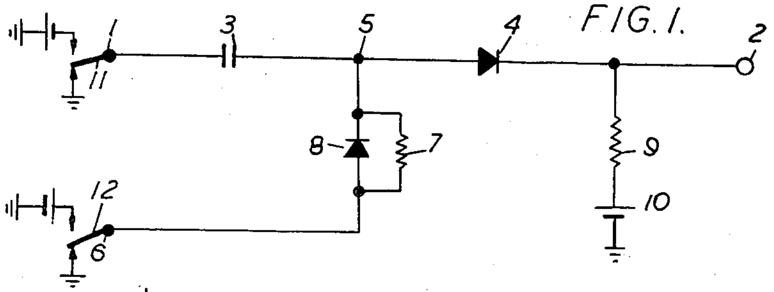
Fig. 1 represents an impulse coincidence circuit incorporating features of the present invention.
Figure 2:
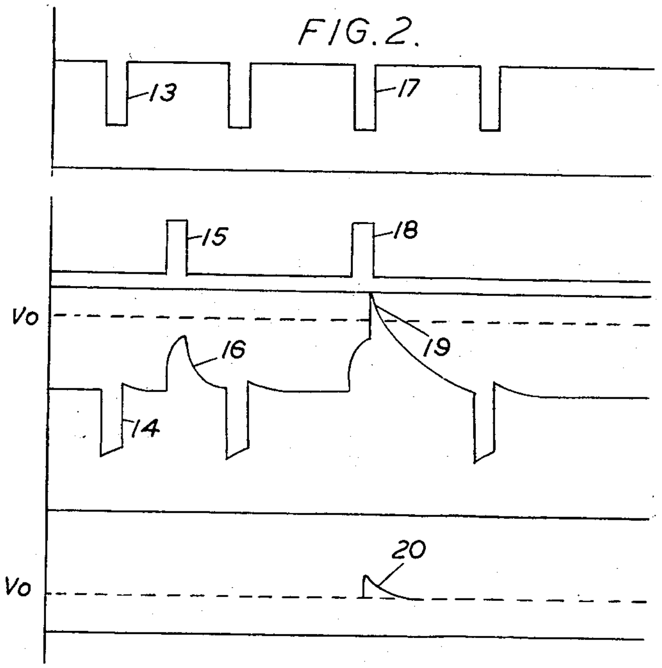
Fig. 2 represents impulse diagrams.

Referring to Fig. 1, there is shown in 1, an input terminal which is connected to the output terminal 2 through the condenser 3 and the rectifier 4 which offers its minimum resistance in the direction from 1 towards 2. The point 5, common to the condenser 3 and to the rectifier 4 is connected to the second input terminal 6 of the device by a circuit comprising a resistance 7 and a rectifier 8 connected in parallel, the rectifier being connected in order to offer its lowest resistance in the direction from 6 towards 5. The resistance 7 is not indispensable for the operation of the circuit and the reverse resistance of the rectifier 8 may be sufficient in certain particular cases. The terminal 2 is connected by a resistance 9 to the positive terminal of a battery 10. The potential of the battery 10 will be designated by $V_o$. There are represented schematically by means of the switches 11 and 12 the devices permitting to apply to the terminals 1 and 6 respectively the control impulses and it is assumed that when no impulse is applied to a control terminal this terminal is connected to ground, for example through the back contact of the corresponding switch. If there is applied to the terminal 1 a negative impulse such as 13 (Fig. 2) the condenser 3 charges and the potential of the point 5 varies as this is shown in 14 (Fig. 2), the direction of the current being such that the rectifier 8 offers a low resistance. The condenser 3 discharges then slowly, the direction of the current being then such that the rectifier 8 offers a high resistance. If there is applied to the terminal 6 a positive impulse such as that represented in 15 (Fig. 2), the condenser 3 charges and the potential of the point 5 varies as this is shown in 16 (Fig. 2). If negative and positive impulses respectively are applied simultaneously to the terminals 1 and 6 as this is shown in 17 and 18, the condenser charges up to the sum of the potentials of the impulses applied, and at the end of the impulse 17, the potential of the point 5 reaches the value shown in 19, which is equal to the sum of the absolute values of the control impulses applied in 1 and 6. If this value is greater than the voltage $V_o$ of the battery 10 the rectifier 4 becomes conductive and an impulse, such as that represented in 20, appears at the terminal 2. It is easy to see that the duration of this impulse depends upon the time constants of the circuit, particularly upon the value of the resistances 7 and 9, of the reverse resistance of the rectifier 8 and of the direct resistance of the rectifier 4.

On the other hand, the front edge of the impulse which appears at the terminal 2 corresponds to the trailing edge of the negative impulse applied to the terminal 1.

Figure 3:
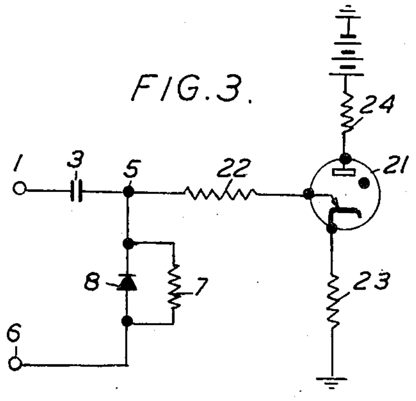
Fig. 3 represents a coincidence circuit incorporating features of the invention and used as the control circuit of a gas tube.

There is shown in Fig. 3 an embodiment of the circuit of Fig. 1 to the triggering of a cold cathode tube after the coincidence of two control impulses. In this figure, the elements fulfilling the same function as in Fig. 1 are designated with the same references. The triggering electrode of the cold cathode tube 21 is connected to point 5 by resistance 22. The cathode is connected to the ground resistance 23 whereas the anode is connected to the positive terminal of a high voltage battery by resistance 24. If the amplitude of the impulses is suitably chosen, the triggering electrode reaches the potential necessary for causing the triggering of the tube only when the condenser 3 is charged by two impulses, negative and positive respectively, applied to the terminals 1 and 16.

While the principles of the invention have been described above in connection with specific embodiments and particular modifications thereof, it is to be clearly understood that the description is made only by way of example and not as a limitation of the scope of the invention.

What is claimed is:

1. An impulse coincidence circuit comprising a condenser having two terminals, a source of negative impulses, means for applying the negative impulses from said source across said condenser to charge said condenser with a given polarity, and with one terminal of said condenser at a predetermined potential, a source of positive impulses, means for applying the positive impulses from said last-mentioned source across said condenser to charge said condenser with the same polarity but with the other terminal at said predetermined potential, means including both said impulse-applying means to apply said impulses across said condenser from said sources in series and with neither terminal at said predetermined potential upon simultaneous operation of said impulse-applying means, a threshold circuit connected across said condenser, and means for causing said threshold circuit to operate in response to simultaneous operation of said impulse-applying means to apply impulses from both sources in series across said condenser.

2. An impulse coincidence circuit, according to claim 1, in which the means for applying the positive impulses from the source of positive impulses to the condenser comprises a rectifier, said rectifier being so poled that the charging current for the condenser traverses said rectifier in the direction corresponding to its lowest resistance.

3. An impulse coincidence circuit, according to claim 2, further comprising a resistance connected across the rectifier.

4. An impulse coincidence circuit, according to claim 1, in which the threshold circuit comprises a gas tube having at least a cathode, an anode, and a triggering electrode, the said triggering electrode being connected to the terminal of the condenser which is at the predetermined potential when the condenser is charged by a negative impulse, and means for biasing said cathode at such a potential that the potential of said triggering electrode will not reach such a potential with respect to said cathode as to fire said tube except when said condenser is charged simultaneously by a positive and a negative impulse.

References Cited in the file of this patent

UNITED STATES PATENTS

| | | |
|---|---|---|
| 2,329,048 | Hullegard | Sept. 7, 1943 |
| 2,580,771 | Harper | Jan. 1, 1952 |
| 2,597,796 | Hundel | May 20, 1952 |
| 2,685,039 | Scarbrough et al. | July 27, 1954 |

OTHER REFERENCES

"Diode Coincident and Mixing Circuits in Digital Counters," by the Tung Chang Chen, Proceedings of I.R.E., May 1950, pp. 511–514.